United States Patent [19]
Horita

[11] Patent Number: 4,543,226
[45] Date of Patent: Sep. 24, 1985

[54] METHOD AND APPARATUS FOR HEAT SETTING FASTENER ELEMENTS

[75] Inventor: Yoshiyuki Horita, Toyama, Japan

[73] Assignee: Yoshida Kogyo K.K., Tokyo, Japan

[21] Appl. No.: 604,163

[22] Filed: Apr. 26, 1984

[30] Foreign Application Priority Data

May 2, 1983 [JP] Japan .................................. 58-78035

[51] Int. Cl.⁴ .......................... B29C 23/00; B29D 5/00
[52] U.S. Cl. .................................. 264/230; 264/288.8; 264/289.6; 264/291; 264/DIG. 71; 425/384; 425/446; 425/812
[58] Field of Search ............... 425/812, 383, 384, 446; 264/230, 291, 289.6, DIG. 71, 288.4, 288.8, 280

[56] References Cited

U.S. PATENT DOCUMENTS 3,490,108  1/1970  Frohlich .............................. 264/342
4,304,748  12/1981  Takahashi ........................... 425/814
4,336,220  6/1982  Takahashi ........................ 264/288.8

Primary Examiner—Willard E. Hoag
Attorney, Agent, or Firm—Hill, Van Santen, Steadman & Simpson

[57] ABSTRACT

A method of heat setting spaced fastener elements on a fastener chain includes contracting a formed thermoplastic wire constituting the fastener elements, while heating the fastener chain to which the formed wire is affixed, until the pitch of the fastener elements attains a predetermined value smaller than the value of a desired pitch and subsequently cooling the formed wire while the wire is stretched to provide the desired element spacing. Apparatus for practicing the method includes a rotated heating wheel having circumferential teeth the pitch whereof is less than the desired element pitch in order to engage and contract the formed thermoplastic wire while the fastener chain bearing the wire is heated, a rotated cooling wheel having circumferential teeth the pitch whereof is equal to the desired element pitch in order to engage and stretch the molded wire while the fastener chain, received from the heating wheel, is cooled, and means for heating the fastener chain as the chain traverses the outer periphery of the heating wheel.

5 Claims, 8 Drawing Figures

METHOD AND APPARATUS FOR HEAT SETTING FASTENER ELEMENTS

BACKGROUND OF THE INVENTION

1. Field of the Invention

This invention relates to a method and apparatus for heat setting fastener elements on a fastener chain comprising a pair of interlocked fastener stringers each of which consists of a tape on one longitudinal edge whereof is sewn a thermoplastic wire forming the fastener elements.

2. Description of the Prior Art

A slide fastener known in the art includes fastener elements which are sewn onto one longitudinal edge of each of a pair of tapes. The fastener elements along one edge of a tape comprise a thermoplastic wire, or monofilament, which is sewn onto the tape after being formed into a coil or zig-zag configuration. Owing to residual stress which accompanies the forming of the wire, the wire experiences subsequent deformation that causes the fastener element pitch, namely the spacing between adjacent fastener elements, to change. To avoid this phenomenon, it is common practice to heat set the fastener elements by applying heat to the molded wire after it has been sewn onto the tape. One example of an apparatus for performing such heat setting is as disclosed in the specification of U.S. Pat. No. 3,730,817 issued on May 1, 1973. In the disclosed apparatus, a fastener stringer is wound about the outer periphery of a drum, the drum having sprockets projecting from its outer periphery in such a manner that the sprocket teeth are inserted between adjacent fastener elements wound on the drum. While the sprocket teeth thus maintain the fastener elements at the proper pitch, the wire is heated and thermally set by application of ultrasonic energy.

A problem is encountered with the above-described apparatus when the formed wires are fabricated by different forming machines, in which case some difference in fastener element pitch from one stringer to another cannot be avoided, or when different sewing machines are used. Specifically, even if the wires are formed by the same machine, use of different sewing machines can result in a different element pitch when the fastener elements are sewn on the tape. Accordingly, there are often occasions where the pitch or spacing between fastener elements belonging to the two stringers of one chain is different before the fastener elements are set by heat. If heat setting is carried out under these conditions while the elements are deformed until a certain pitch is attained, not only will a perfectly uniform element pitch not be obtained owing to a difference in spring-back, but a disparity in residual stress also will be brought about, the latter depending upon a difference in the degree of plastic deformation. Consequently, when a chain comprising such interlocked fastener stringers is subsequently heated for dyeing or the like, a difference arises between the element pitch on one stringer and the element pitch on the other. The inevitable result is undesirable wrinkling of the tapes.

SUMMARY OF THE INVENTION

An object of the present invention is to provide a heat setting method and apparatus devoid of the aforementioned problems encountered in the prior art.

Another object of the present invention is to provide a heat setting method and apparatus for assuring accurate spacing between fastener elements, and for virtually eliminating subsequent spacing error.

According to the present invention, the foregoing objects are attained by providing a heat setting method which includes steps of causing a formed wire to undergo contraction once, while heating the fastener chain on which the formed wire is mounted, until the spacing of the fastener elements formed by the wire attains a predetermined value smaller than the value of a desired spacing, and subsequently cooling the formed wire while the wire is stretched to provide the desired spacing. Since the molded wire thus undergoes deformation once in the direction of contraction to uniformalize the fastener element spacing and then is stretched to provide the desired spacing, the degree to which a plurality of chains is stretched will be the same for each one of the chains, thereby providing an accurate element spacing which will not differ from one stringer to another. Moreover, even if plastic deformation results in some residual stress, the stress will be the same for the elements or stringers forming the chain. This prevents fastener element spacing from developing any irregularity as caused by heat applied in a subsequent process step such as dyeing.

The apparatus of the present invention, which is used to practice the foregoing method, comprises a heating wheel having an outer peripheral portion provided with teeth having a spacing smaller than the desired spacing of the fastener elements, the teeth being adapted to penetrate between adjacent fastener elements, a cooling wheel having an outer peripheral portion provided with teeth having a spacing equal to the desired spacing of the fastener elements, the teeth being adapted to penetrate between adjacent fastener elements, means for guiding the fastener chain in such a manner that the fastener chain is wound around the outer peripheral portion of the heating wheel, subsequently wound around the cooling wheel, and then removed from the cooling wheel, and heating means for heating the fastener chain while the fastener chain travels along the outer peripheral portion of the heating wheel.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
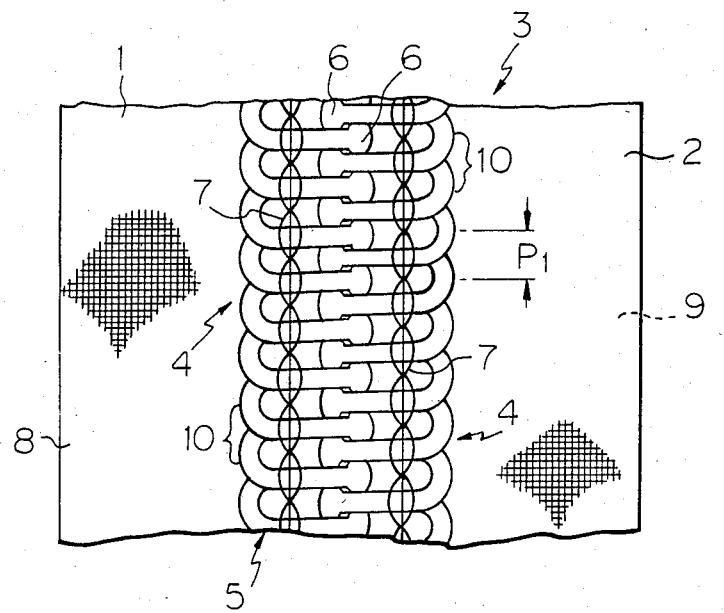
FIG. 1 is a plan view of a fastener chain before heat setting.

FIG. 1 illustrates a fastener chain 3 comprising a pair of interlocked stringers 1, 2. In the illustrated embodiment, a formed wire 4 made of a monofilament of a thermoplastic such as nylon or polyester has the configuration of a coil 5. As is well-known in the art, the coil 5 is molded by winding the wire around a mandrel, with portions of the coil being compressed to form element heads 6. Each loop of the coil corresponds to a single element, shown at numeral 10. The coils are sewn onto respective tapes 8, 9 by threads 7 that secure the elements 10 at portions corresponding to the legs thereof. While the elements 10 of each coil 5 have a nominal spacing or pitch P1 it is possible that the coils on the stringers 1, 2 will have a somewhat different pitch owing to the use of different forming and sewing machines for forming and attaching the coils.

Figure 2:
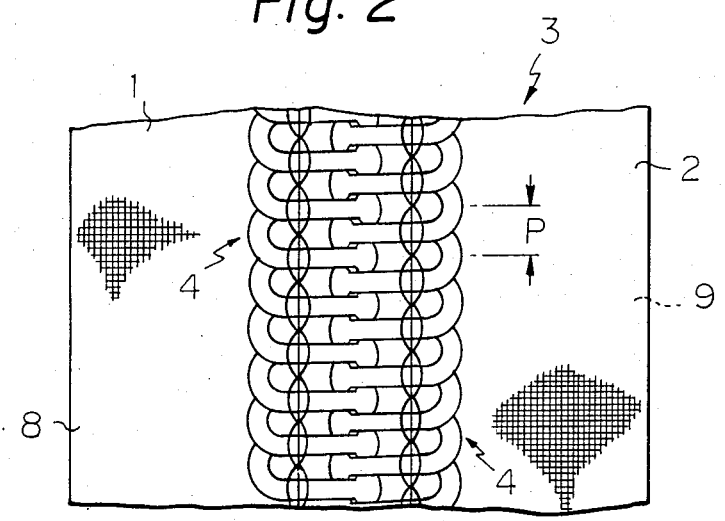
FIG. 2 is a plan view of a fastener chain after heat setting.
Figure 3:
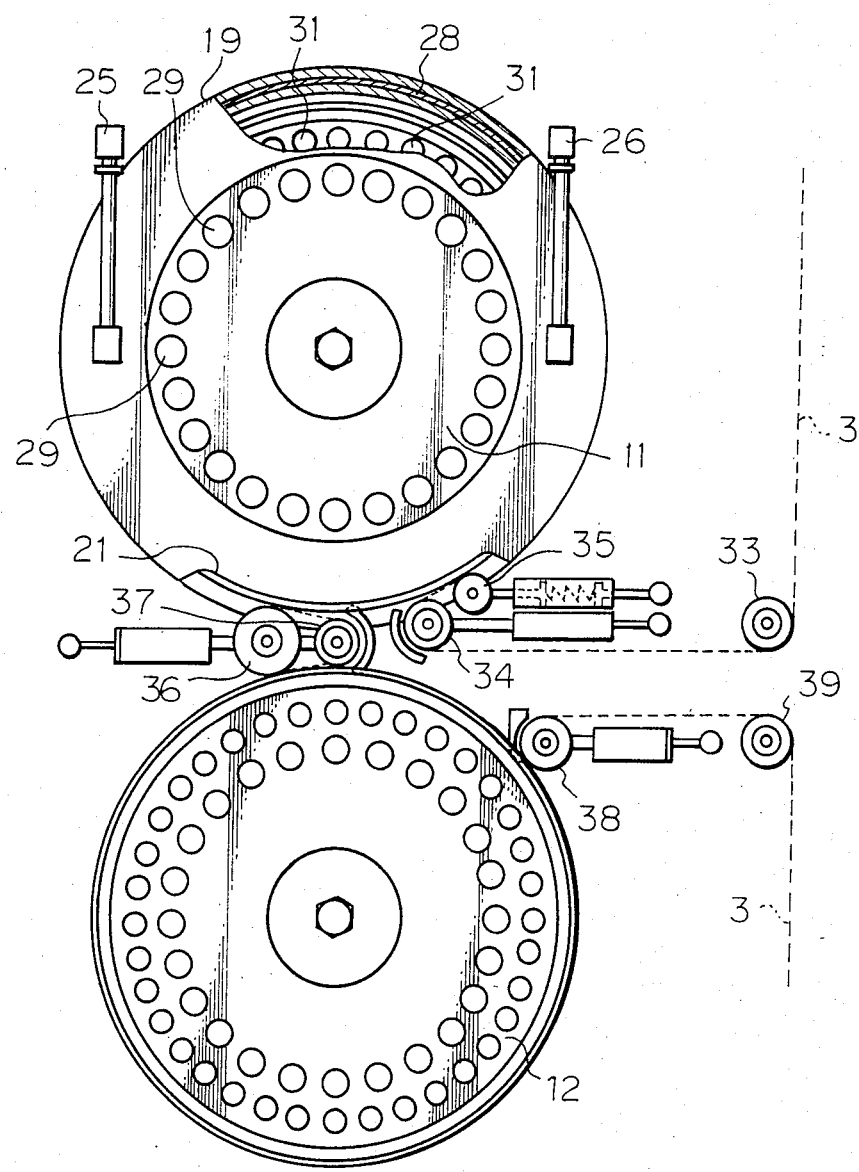
FIG. 3 is a front view, partially shown in section, illustrating an embodiment of a heat setting apparatus according to the present invention.
Figure 4:
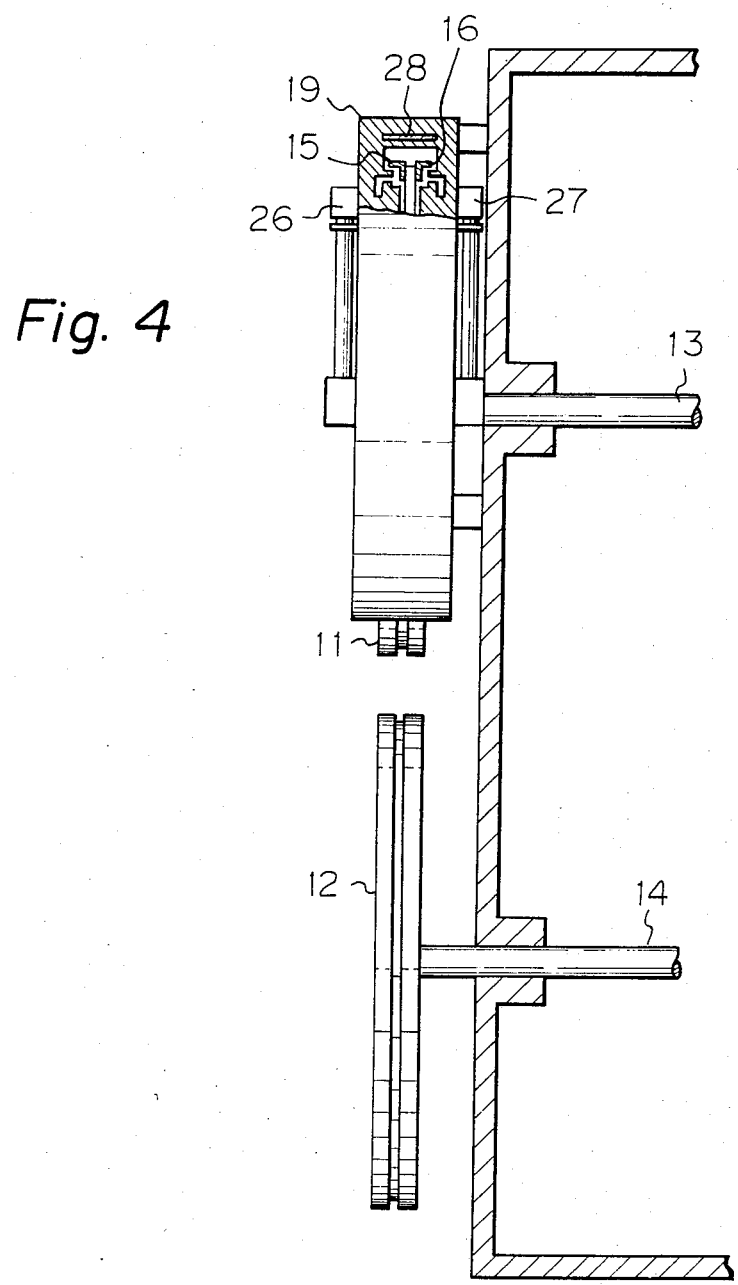
FIG. 4 is a side view, partially shown in section, illustrating the apparatus shown in FIG. 3.
Figure 5:
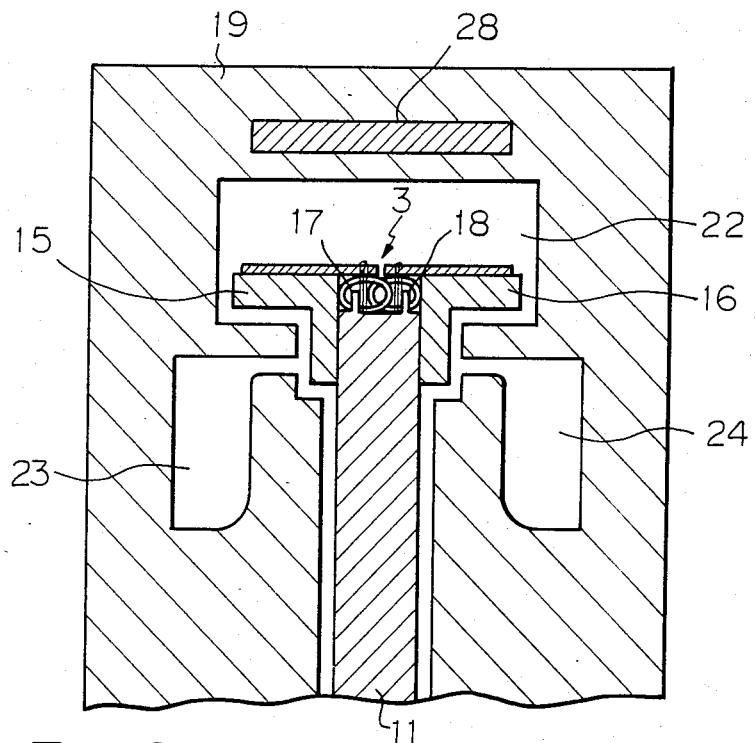
FIG. 5 is a view showing an enlargement of a portion of FIG. 4.
Figure 6:
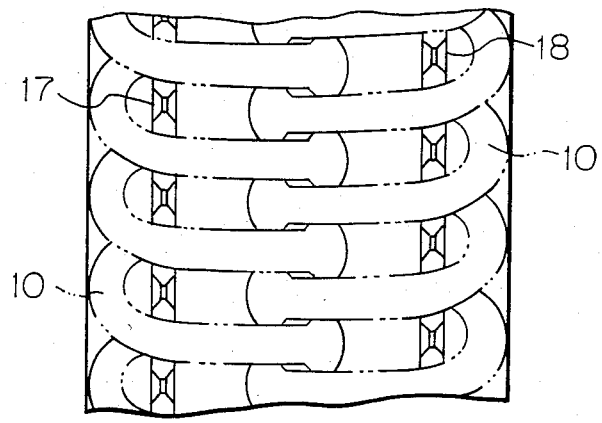
FIG. 6 is a top view of a fastener chain in the attitude shown in FIG. 5.
Figure 7:
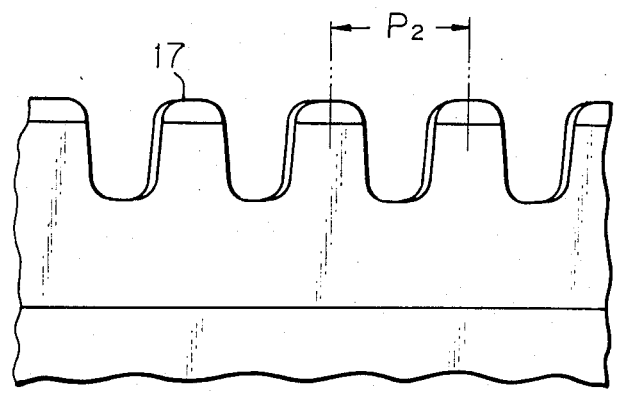
FIG. 7 is a side view showing a portion of the outer periphery of a heating wheel included in the apparatus of FIG. 3.

A preferred embodiment of a heat setting apparatus in accordance with the present invention is illustrated in FIGS. 3 and 4. The apparatus includes a heating wheel 11 and a cooling wheel 12. Secured to the wheels 11, 12 are respective shafts 13, 14 connected to a common motor (not shown) for rotating the wheels 11, 12 at the same angular speed. As shown in FIG. 5, the heating wheel 11 has left and right tape supporting members 15, 16 provided along its outer periphery, and is so adapted that the tapes 8, 9 of the respective left and right stringers 1, 2 are supported on the members 15, 16. The outer periphery of the heating wheel 11 is also provided with two rows of teeth 17, 18. As shown in FIG. 7, the teeth 17, 18 (of which only the teeth 17 are illustrated) are spaced apart at a pitch P2, which is smaller than a pitch P (FIG. 2) desired for the elements 10, and smaller than the element pitch P1 (FIG. 1) before heat setting. Further, as shown in FIG. 6, the teeth 17, 18 are staggered relative to each other by a distance equivalent to one-half pitch, whereby the teeth 17, 18 are capable of penetrating the spaces between adjacent elements 10 on the stringers 1, 2. As shown in FIG. 6, the side faces of each tooth 17, 18 are inclined so as to match the inclination of the elements 10 and, hence, to avoid flawing the elements.

An apparatus for heating the elements 10 is provided along the outer periphery of the heating wheel 11. In the illustrated embodiment, the heating apparatus includes a cover 19 which, with the exception of a portion thereof constituting an opening 21 for acceptance and retrieval of the fastener chain 3, conceals the outer peripheral portion of the heating wheel 11. The cover 19 has a circumferentially extending hot air passage 22 (FIG. 5) in which the fastener chain 3 supported on the outer periphery of the heating wheel 11 is take up, as well as two auxiliary hot air passages 23, 24 extending in parallel with the hot air passage 22. Each of the auxiliary hot air passages 23, 24 has branch passages respectively communicating with the hot air passage 22 and the space on the associated side of the heating wheel 11. The heating apparatus also includes hot air supply devices 25, 26, 27 for supplying hot air to the auxiliary hot air passages 23, 24, whence the hot air is fed into the hot air passage 22 to heat the chain 3 before exiting from the opening 21 in cover 19, while a portion of the hot air is distributed over the side surfaces of the heating wheel. The cover 19 further includes a circumferentially extending electrical heater 28 to promote the heating caused by the hot air from the hot air supply devices.

The heating wheel 11 heated by the distributed hot air is provided with a multiplicity of holes 29, 31 which shorten the time needed for the temperature of the heating wheel to rise, and which improve the heat dissipating effect. The holes thus serve to prevent the temperature of the heating wheel proper from rising excessively.

Figure 8:
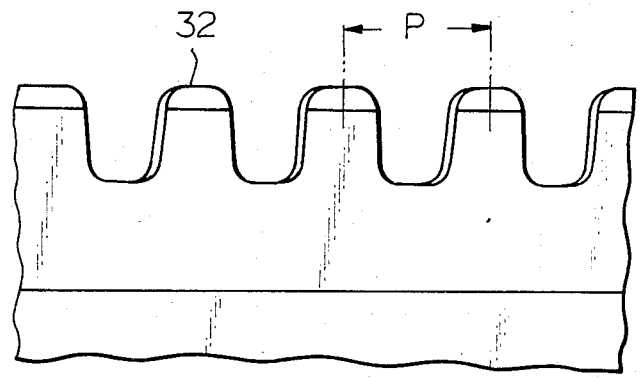
FIG. 8 is a side view showing a portion of the outer periphery of a cooling wheel included in the apparatus of FIG. 3.

The cooling wheel 12 has a configuration almost the same as that of the heating wheel 11, the only difference being that the pitch of the teeth provided on its outer periphery is larger than that of the teeth possessed by the heating wheel. Like the heating wheel 11, the cooling wheel 12 is provided with two circumferentially extending rows of teeth 32 (only one of which is shown in FIG. 8). These teeth have a spacing or pitch P equivalent to the final pitch desired for the fastener elements. Note that the pitch P is greater than the pitch P2 of the teeth provided on the heating wheel 11.

As shown by the dashed lines in FIG. 3, the fastener chain 3 is passed over guide rollers 33, 34 and then held in pressured contact with the outer periphery of the rotating heating wheel 11 by a pressure roller 35. As a result, the chain 3 is taken up by the heating wheel 11 and transported circumferentially while being retained thereon with the teeth 17, 18 penetrating the spaces between the adjacent elements 10. The chain 3 is then delivered to the rotating cooling wheel 12 upon passing over a pressure roller 36 and guide roller 37. The chain 3 delivered to the cooling wheel 12 is pressed between the pressure roller 37 and the outer periphery of the cooling wheel, whereby the chain is taken up by the cooling wheel 12 and transported circumferentially while being retained thereon with the teeth 32 penetrating the spaces between the adjacent elements 10. The chain 3 leaves the cooling wheel 12 and is paid out to a point external to the system via guide rollers 38, 39.

During the movement of the fastener chain 3 along the outer periphery of the heating wheel 11, the formed wire 4 is heated by the hot air in the hot air passage 22 and the heating wheel 11 while the teeth 17 (18) cause the wire to contract until the pitch of the elements 10 attains the reduced pitch P2. Consequently, the wire 4 undergoes plastic deformation until the pitch P2 is obtained. Next, during movement of the fastener chain 3 along the outer periphery of the cooling wheel 12, the wire 4 is cooled and heat set while the teeth 32 stretch the wire to provide the elements 10 with the pitch P2. The chain 3 following heat setting is shown in FIG. 2. The formed wire 4 thus undergoes deformation once in the direction of contraction to uniformalize the pitch at the value P2, and then is stretched to provide the pitch P. Therefore, the extent to which a plurality of the chains 3 is stretched will be uniform for each one of the chains, thereby providing an accurate pitch P which will not differ from one stringer to another. In addition, even if some residual stress should result from the plastic deformation, such stress will be the same for the elements or stringers forming the chain. This prevents skewing of the element pitch due to heat applied in a subsequent process step such as dyeing.

Where the tapes 8, 9 and sewing thread 7 consists of heat-shrinkable fibers such as polyester, as is ths case in common slide fasteners, heating the entirety of the slide fastener chain 3 by the hot air as in the illustrated embodiment causes the tapes and sewing thread to shrink. These will then be stretched along with the formed wire 4 when they travel along the outer periphery of the cooling wheel 12. As a result, the tapes do not wrinkle and the sewing thread is tensioned to a greater degree to more securely anchor the elements 10 to the tapes 8, 9. Though the tapes attempt to migrate radially inwardly of the heating wheel 11 when heated and caused to shrink thereby, this is prevented by the tape supporting members 15, 16 which retain the tapes reliably in place.

What is claimed is:

1. A method of heat setting fastner elements on a fastener chain comprising a pair of interlocked fastencr stringers each of which consists of a tape having a formed thermoplastic wire forming the fastener elements sewn thereon, said method comprising steps of:
    (a) contracting the formed wire, while heating the fastener chain, until a pitch possessed by the fastener elements attains a predetermined value smaller than a value of a desired pitch, and
    (b) subsequently cooling the formed wire while stretching the formed wire until the pitch possessed by the fastener elements attains the value of the desired pitch.

2. The method according to claim 1, wherein the formed wire is sewn on the tape with a sewing thread, said thread and said tapo consisting of a heat-shrinkable plastic.

3. An apparatus for heat setting fastener elements on a fastener chain comprising a pair of interlocked fastener stringers each of which consists of a tape having a formed thermoplastic wire forming the fastener elements sewn thereon, said apparatus comprising:

a heating wheel having an outer peripheral portion provided with teeth having a pitch smaller than a desired pitch of the fastener elements, said teeth being adapted to penetrate between adjacent ones of the fastener elements;
   a cooling wheel having an outer peripheral portion provided with teeth having a pitch equal to the desired pitch of the fastener elements, said teeth being adapted to penetrate between adjacent ones of the fastener elements;
   means for guiding the fastener chain in such a manner that the fastener chain is wound around the outer peripheral portion of said heating wheel, subsequently wound around said cooling wheel, and then removed from said cooling wheel; and
   heating means for heating the fastener chain while the fastener chain travels along the outer peripheral portion of said heating wheel.

4. The apparatus according to claim 3, wherein said heating means comprises:
   a cover disposed to cover the outer peripheral portion of said heating wheel in such a manner that a circumferentially extending hot air passage is formed betwcen the outer peripheral portion of the said heating wheel and said cover, and
   means for supplying said hot air passage with hot air.

5. The apparatus according to claim 3 or claim 4, wherein each of said heating wheel and cooling wheel has a tape support member provided on the outer peripheral portion thereof for supporting the tape.

* * * * *